United States Patent [19]
Allen et al.

[11] Patent Number: 4,692,617
[45] Date of Patent: Sep. 8, 1987

[54] METHOD AND SYSTEM FOR NEUTRON LIFETIME LOGGING

[75] Inventors: Linus S. Allen, Dallas; William R. Mills, Jr., Duncanville; David C. Stromswold, Addison, all of Tex.

[73] Assignee: Mobil Oil Corporation, New York, N.Y.

[21] Appl. No.: 740,599

[22] Filed: Jun. 3, 1985

[51] Int. Cl.$^4$ ............................................. G01V 5/10
[52] U.S. Cl. ................................... 250/270; 250/269; 250/268
[58] Field of Search ...................... 250/269, 270, 268

[56] References Cited

U.S. PATENT DOCUMENTS

| | | | |
|---|---|---|---|
| 2,996,618 | 8/1961 | Goodman et al. | 250/270 |
| 3,240,938 | 3/1966 | Hall, Jr. | 250/270 |
| 3,254,221 | 5/1966 | Saurenman | 250/268 |
| 3,608,373 | 9/1971 | Youmans | 250/268 |
| 3,688,117 | 8/1972 | Givens | 250/269 |
| 3,869,608 | 3/1975 | Scherbatsky | 250/270 |
| 4,078,174 | 3/1978 | Goldman | 250/270 |
| 4,097,737 | 6/1978 | Mills, Jr. | 250/269 |

Primary Examiner—Craig E. Church
Assistant Examiner—Richard Hanig
Attorney, Agent, or Firm—Alexander J. McKillop; Michael G. Gilman; George W. Hager, Jr.

[57] ABSTRACT

A borehole logging tool for neutron lifetime logging of subterranean formations surrounding a borehole includes a pulsed source of fast neutrons and a radiation detector for measuring neutrons returning to the borehole from the irradiated formations surrounding the borehole. The radiation detector system comprises a neutron absorbing and gamma ray radiating material which is moved by an articulating arm into contact with the borehole wall and is azimuthally oriented so that such neutron absorbing and gamma ray radiating material is firmly pressed against the formation. A shielding material minimizes absorption of neutrons from the borehole fluid. A gamma ray detector located in the main body of the logging tool detects gamma rays from the radiating material as a measure of the epithermal or thermal lifetime characteristic of the formation adjacent the borehole.

14 Claims, 3 Drawing Figures

METHOD AND SYSTEM FOR NEUTRON LIFETIME LOGGING

BACKGROUND OF THE INVENTION

This invention relates to radioactive well logging processes and systems for irradiating subterranean formations under investigation with bursts of fast neutrons and, more particularly, to an improved method and system for characterizing the formation on the basis of the lifetime of the subsequently produced epithermal or thermal neutron population.

Various techniques may be employed in order to characterize subterranean formations with regard to their fluid or mineral content, lithologic characteristics, porosity, or to provide for stratigraphic correlation. The neutron source may be a steady-state source or a pulsed source. For example, neutron porosity logging may be carried out using a steady-state neutron source in order to bombard the formation with fast neutrons. The porosity of the formation then may be determined by measuring thermal neutrons employing two detectors at different spacings from the source or by measuring epithermal neutrons with a single detector.

In pulsed neutron logging procedures, the formations are irradiated with repetitive bursts of fast neutrons, normally neutrons exhibiting an energy greater than 1 Mev. When the fast neutrons enter the formation, they are moderated to lower energy levels by the nuclear collision processes of elastic and inelastic scattering. In elastic scattering the neutron loses a portion of its energy in a collision that is perfectly elastic, i.e., the energy lost by the neutron is acquired as kinetic energy by the nucleus with which it collides. In inelastic scattering only some of the energy lost by the neutron is acquired as kinetic energy by the nucleus with which it collides. The remaining energy loss generally takes the form of a gamma ray emitted from the collision nucleus.

In the course of moderation, the neutrons reach the epithermal range and thence are further moderated until they reach the thermal neutron range. Thermal neutrons are neutrons which are in thermal equilibrium with their environment. The distribution in speed of thermal neutrons follows the so-called Maxwellian distribution law. The energy corresponding to the most probable speed for a temperature of 20° C. is 0.025 electron volt. Epithermal neutrons are those neutrons which exhibit energies within the range from immediately above the thermal neutron region to about 100 electron volts. While the boundary between thermal and epithermal neutrons is, of necessity, somewhat arbitrary, it is normally placed in the range of 0.1–10.0 electron volts.

The populations of neutrons at the various energy levels decay with time following primary irradiation and thus offer means of characterizing the formation. For example, in the case of elastic scattering, which predominates for energies between a few electron volts and about 1 Mev, the number of collisions required for a neutron to moderate from one energy level to a second lower energy level varies more or less directly with the atomic weight of the nuclei available for collision. In subterranean formations, hydrogen nuclei present in hydrogenous materials such as oil, water, and gas tend to predominate in the slowing down process. Thus, the die-away rate of the epithermal neutron population gives a qualitative indication of the amount of hydrogenous material present which, in turn, may be indicative of the porosity of the formation.

For example, U.S. Pat. No. 4,097,737 to Mills discloses a method and system for epithermal neutron lifetime logging utilizing a 14-Mev pulsed neutron source and a neutron detector that is sensitive to epithermal neutrons and highly discriminatory against thermal neutrons. The detector is relatively insensitive to the high energy neutrons and has a filter that renders it sharply insensitive to thermal neutrons.

SUMMARY OF THE INVENTION

In accordance with the present invention, there is provided a method for the neutron lifetime logging of subterranean formations surrounding a borehole. A borehole logging tool employs a pulsed neutron source for irradiating the formation surrounding a borehole with fast neutrons. A radiator having a neutron absorbing and gamma ray radiating material is placed in juxtaposition with the borehole wall. The radiator is shielded from neutron radiation from the borehole fluid so that its directional sensitivity to secondary formation neutron radiation is maximized. The radiator, in response to absorption of such secondary formation neutron radiation, produces neutron capture gamma radiation. A gamma ray detector employed by the logging tool measures such neutron capture gamma radiation as being indicative of the irradiated formation surrounding the borehole.

A pad houses both the radiator and the shielding material. The radiator is positioned to one side of the pad with the shielding material filling the remaining portion of the pad. Means is provided on the borehole tool for moving the pad into contact with the borehole wall and azimuthally orienting the pad so that the side of the pad housing the radiator is firmly pressed against the borehole wall. The length of the pad permits the focusing of the directional sensitivity of the radiator on formation secondary radiation to the exclusion of borehole secondary radiation along any borehole enlargement that is greater in length than the length of the pad. Preferably, the length of the pad is no greater than about one foot.

The neutron absorbing and gamma ray radiating material forming the radiator is characterized by a large radiative neutron capture cross-section. For thermal neutron lifetime logging, this material may include cadmium, gadolinium or indium. For epithermal neutron lifetime logging, the cadmium, gadolinium or indium may be lithium filtered. The shielding material may be boron or lithium, preferably contained in a polyethylene base material.

DESCRIPTION OF THE PREFERRED EMBODIMENT

The present invention is directed to a new and improved method and system for neutron lifetime logging.

In thermal neutron lifetime logging for the determination of hydrocarbon saturation and in epithermal neutron lifetime logging for the determination of rock porosity, a measurement of the die-away rate of secondary radiation arising from injected neutrons is governed by the properties of the formation and the properties of the borehole. This measurement is accomplished normally by delaying the analysis period relative to the neutron burst so as to allow the faster decaying neutron population in the borehole fluid to dissipate before measuring the slower-decaying radiation signal from the formation. An alternative to such use of a long delay period is to attempt to eliminate the borehole fluid effect by focusing the radiation detector strongly on the formation by pressing the radiation detector firmly against the borehole wall and shielding the sensitive detector from radiation emanating from the borehole fluid. Thus, by suppressing radiation from the borehole fluid, analysis of the decaying neutron population can be initiated sooner and will benefit from the use of radiation measurements of higher statistical quality.

It is, therefore, the specific feature of the present invention to provide a new and improved method and system for borehole neutron lifetime logging which eliminates such borehole fluid effect by the use of an articulated radiator pad whose sensitivity is focused strongly on the formation. The function of the radiator is to selectively absorb neutrons as they enter the borehole from the formation. Prompt capture gamma rays resulting from absorption are emitted by the radiator and a portion of these is detected within the main body of the logging tool.

Figure 1:
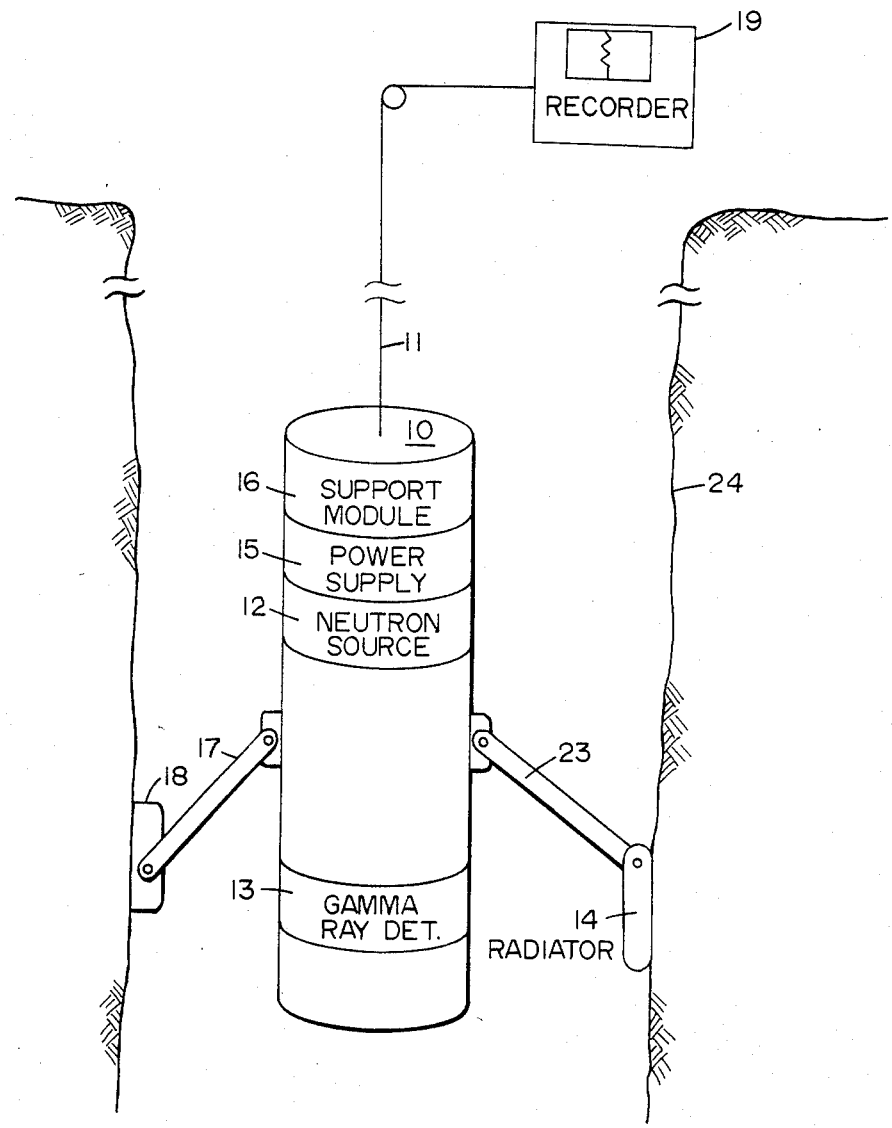
FIG. 1 illustrates a borehole logging tool employing an articulated pad containing a radiator for use in the neutron lifetime logging method of the present invention.

Referring now to FIG. 1, there is shown the borehole logging system of the present invention. A borehole tool 10, supported by cable 11, comprises a high energy pulsed neutron source 12, a gamma ray detector 13 and an articulated radiator pad 14. A high-voltage power supply 15 is provided for the source 12 and a module 16 is provided with circuits for utilization and modification of signals from gamma ray detector 13. Also included are circuits for the control of the high voltage power supply 15. A backup arm 17 with attached pad 18 extending from the logging tool 10 may be included to force the tool to follow the average contour of the borehole wall 24. Cable 11 extends to a surface unit 19 where the signals from the gamma ray detector 13 are recorded along with an indication of borehole depth.

Figure 2:
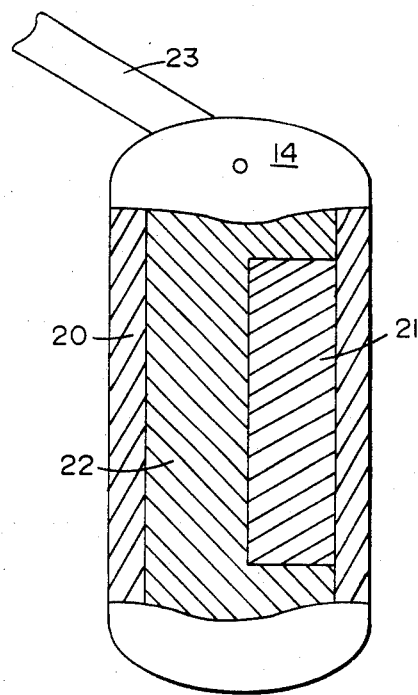
FIGS. 2 and 3 are vertical and horizontal cross-sectional views, respectively, of the articulated radiator pad of the borehole logging tool of FIG. 1.
Figure 3:
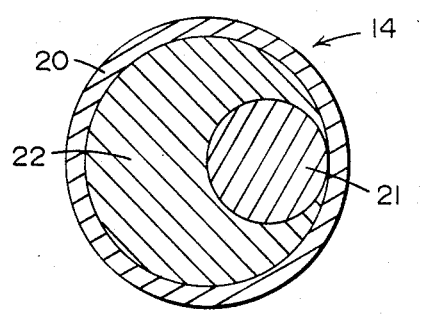

To accomplish the specific feature of the present invention of eliminating the troublesome borehole radiation effects on the formation radiation measurement, the radiator pad 14 is articulated so as to be pressed against the borehole wall 24. Vertical and horizontal cross-sectional views of the radiator pad 14 are shown in FIGS. 2 and 3, respectively. The pad 14 comprises a housing 20 containing a radiator material 21 and a neutron shielding material 22. The radiator material 21 is positioned against one side of housing 20 and the neutron shielding material (i.e., neutron moderating and absorbing material) 22 fills the remaining portion of the housing 20. The arm 23 moves the pad 14 into contact with the borehole wall 24 and also azimuthally orients the pad so that the side of the housing 20 against which the radiator material 21 is positioned is firmly pressed against the formation. Radiator material 21 is a strong neutron absorbing and gamma ray radiating material, such as cadmium, for example. By firmly pressing the side of the housing 20 containing the radiator material 21 against the borehole wall, the focusing of the directional sensitivity of the radiator material 21 on the formation neutron radiation is maximized while its directional sensitivity to neutron radiation from the borehole fluid is minimized by the moderation and absorption of such borehole fluid neutron radiation by the surrounding neutron shielding material 22. The use of pad 14 permits the focusing of the directional sensitivity of the radiator pad 14 on formation secondary radiation to the exclusion of borehole secondary radiation from borehole fluid along any borehole enlargement that is greater in length than the length of pad 14. The pad is generally no greater than about one foot in length and is preferably in the order of 6 to 8 inches. Upon absorbing formation neutrons, the radiator material 21 radiates neutron capture gamma rays which are detected by the gamma ray detector 13 located within the main portion of the logging tool 10.

Any number of materials may be utilized for the radiator material 21 and neutron shielding material 22. For thermal neutron lifetime logging, the radiator material 21 should be characterized by a large radiative neutron capture cross-section. Examples of such materials are cadmium, indium, and gadolinium. Suitable neutron shielding material 22 may be o boron or lithium, preferably contained in a polyethylene base material. Lithium emits no gamma radiation, and boron emits only low-energy radiation which can be discriminated against easily.

For epithermal neutron lifetime logging, the radiator material 21 may comprise gadolinium, cadmium, or indium filtered by lithium, for example. Suitable neutron shielding material 22 may be boron or lithium, preferably contained in a polyethylene base material.

The foregoing described preferred embodiment of the present invention relates to a directional neutron lifetime logging method and system that maximizes sensitivity to radiation from the formation while minimizing sensitivity to radiation from the borehole fluid. It is to be understood that other filtering, shielding and radiating materials than those described above may be successfully utilized as well as an infinite variety of combinations of such materials and that modifications or alterations may be made without departing from the spirit and scope of the invention as set forth in the appended claims.

We claim:

1. A method for neutron lifetime logging of subterranean formations surrounding a borehole, comprising the steps of:
   (a) positioning a radiator having a neutron absorbing and gamma ray radiating material in juxtaposition with the borehole wall,
   (b) shielding said radiator from neutron radiation from the borehole fluid, such that the directional sensitivity of said radiator is maximized with respect to secondary formation neutron radiation and is minimized with respect to borehole neutron radiation,
   (c) irradiating the formations surrounding the borehole with bursts of fast neutrons,
   (d) absorbing secondary formation neutron radiation entering the borehole from the irradiated formations with said radiator,
   (e) radiating neutron capture gamma rays from said radiator in response to absorption of said secondary formation neutron radiation by said radiator, and
   (f) detecting said neutron capture gamma rays as a measure of the neutron lifetime characteristic of the formations surrounding said borehole.

2. A borehole logging tool for the neutron lifetime logging of subterranean formations surrounding a borehole comprising:
   (a) a pulsed source means of fast neutrons for irradiating the formation surrounding the borehole with fast neutrons,
   (b) at least one directionally sensitive radiator assembly for receiving secondary radiation which returns to the borehole from said irradiated formation, and for generating neutron capture gamma radiation in response to said secondary radiation,
   (c) means for positioning said radiator assembly in juxtaposition with said irradiated formation, and
   (d) a gamma ray detector assembly means for measuring said neutron capture gamma radiation, said measured neutron capture gamma radiation being indicative of the neutron lifetime characteristic of said irradiated formation.

3. The borehole logging tool of claim 2 wherein said radiator assembly comprises:
   (a) a neutron absorbing and gamma ray radiating material,
   (b) a shielding material for moderating and absorbing secondary neutron radiation,
   (c) a pad for housing said neutron absorbing and gamma ray radiating material and said shielding material, said neutron aborbing and gamma ray radiating material being positioned against one side of said pad and said shielding material filling the remaining portion of said pad, and
   (d) means for moving said pad against the borehole wall and azimuthally orienting said pad so that the side of said pad against which said neutron absorbing and gamma ray radiating material is positioned is firmly pressed against the borehole wall, such that the focusing of the directional sensitivity of said radiator assembly on the formation is maximized at the point of contact while the directional sensitivity of said radiator assembly to secondary radiation from the borehole is minimzed.

4. The borehole logging tool of claim 3 wherein said neutron absorbing and gamma ray radiating material is characterized by a large radiative neutron capture cross-section.

5. The borehole logging tool of claim 4 wherein cadmium is utilized as said neutron absorbing and gamma ray radiating material for thermal neutron lifetime logging.

6. The borehole logging tool of claim 4 wherein gadolinium is utilized as said neutron absorbing and gamma ray radiating material for thermal neutron lifetime logging.

7. The borehole logging tool of claim 4 wherein indium is utilized as said neutron absorbing and gamma ray radiating material for thermal neutron lifetime logging.

8. The borehole logging tool of claim 4 wherein cadmium filtered by lithium is utilized as said neutron absorbing and gamma ray radiating material for epithermal neutron lifetime logging.

9. The borehole logging tool of claim 4 wherein gadolinium filtered by lithium is utilized as said neutron absorbing and gamma ray radiating material for epithermal neutron lifetime logging.

10. The borehole logging tool of claim 4 wherein indium filtered by lithium is utilized as said neutron absorbing and gamma ray radiating material for epithermal neutron lifetime logging.

11. The borehole logging tool of claim 3 wherein said shielding material is boron.

12. The borehole logging tool of claim 11 wherein said boron is contained in a polyethylene base material.

13. The borehole logging tool of claim 3 wherein said shielding material is lithium.

14. The borehole logging tool of claim 13 wherein said lithium is contained in a polyethylene base material.

* * * * *